United States Patent
Matsuda et al.

(10) Patent No.: US 7,638,611 B2
(45) Date of Patent: Dec. 29, 2009

(54) POLARIZER, COATING LIQUID, AND MANUFACTURING METHOD FOR POLARIZER

(75) Inventors: Shoichi Matsuda, Ibaraki (JP); Kyoko Nishiguchi, Ibaraki (JP); Tadayuki Kameyama, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/351,143

(22) Filed: Jan. 9, 2009

(65) Prior Publication Data

US 2009/0187012 A1    Jul. 23, 2009

(30) Foreign Application Priority Data

Jan. 21, 2008    (JP) .............................. 2008-010221

(51) Int. Cl.
    C09B 31/057    (2006.01)
    G02B 5/30    (2006.01)
(52) U.S. Cl. .......................... 534/836; 534/832; 349/96
(58) Field of Classification Search .................. 534/836
    See application file for complete search history.

(56) References Cited

U.S. PATENT DOCUMENTS

| | | | | |
|---|---|---|---|---|
| 4,143,035 A | * | 3/1979 | Stingl | 534/832 |
| 4,323,498 A | * | 4/1982 | Benguerel | 534/830 |
| 5,616,696 A | * | 4/1997 | Leary, Jr. | 534/667 |

FOREIGN PATENT DOCUMENTS

JP    2007-0241269 A    9/2007

OTHER PUBLICATIONS

Fillipovich et al., "Spectral-Polarization Properties and Light Resistance of Polyvinyl-Alcohol Films Colored With Disazo Dyes", Journal of Applied Spectroscopy, 72(5), 2005.*

* cited by examiner

*Primary Examiner*—Fiona T Powers
(74) *Attorney, Agent, or Firm*—Westerman, Hattori, Daniels & Adrian, LLP

(57) ABSTRACT

A polarizer of the present invention comprises an azo compound which is represented by the following general formula (I). In the general formula (I), $Q_1$ represents an optionally substituted aryl group, $Q_2$ represents an optionally substituted arylene group, M represents a counter ion, l represents an integer of from 1 to 6, and m represents an integer of from 0 to 5 ($l+m \leq 6$).

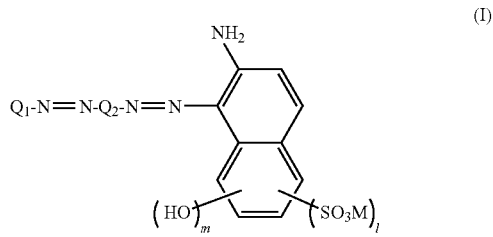

4 Claims, No Drawings

POLARIZER, COATING LIQUID, AND MANUFACTURING METHOD FOR POLARIZER

FIELD OF THE INVENTION

The present invention relates to a polarizer containing an azo compound, a coating liquid containing an azo compound, and a manufacturing method for a polarizer using the coating liquid.

BACKGROUND OF THE INVENTION

Polarizers are optical films having such functions as to allow certain linearly polarized light in polarized light or natural light to transmit. The polarizers are, for example, used in components for liquid crystal displays and used on lenses for polarizing sunglasses.

Generic polarizers used for liquid crystal displays are obtained by stretching a polyvinyl alcohol film dyed with iodine.

In addition, polarizers obtained in accordance with a wet film manufacturing method in which a solution containing an azo compound with lyotropic liquid crystalline property is applied on a base material and dried are known (Japanese Unexamined Patent Publication No. 2007-241269). The thickness of polarizers formed from such the solution containing the azo compound can be much thinner than that of the above described polarizers (polarizers made of the polyvinyl alcohol film dyed with iodine). Therefore, the polarizers formed from the solution containing the azo compound are appropriate for liquid crystal displays, which are required to be thin and light.

It is preferable for polarizers used for liquid crystal displays and the like to have a maximum absorption wavelength in a wavelength range having high visual sensitivity (a wavelength range where the human eye feels the light most intensely). The polarizers having a maximum absorption wavelength in a wavelength range having high visual sensitivity are excellent in terms of the polarization property for visible light. Here, the wavelength range having high visual sensitivity is usually from 520 nm to 580 nm.

In many cases, however, the conventional polarizers containing an azo compound have a maximum absorption wavelength outside the wavelength range having high visual sensitivity.

SUMMARY OF THE INVENTION

An object of the present invention is to provide a polarizer having a maximum absorption wavelength in a wavelength range having high visual sensitivity and a coating liquid.

Another object of the present invention is to provide a manufacturing method for a polarizer having a maximum absorption wavelength in a wavelength range having high visual sensitivity.

The present inventors conducted diligent research on conventional azo compounds in order to find out how to obtain a polarizer having a maximum absorption wavelength in a wavelength range having high visual sensitivity.

In the conventional azo compounds, a hydroxyl group (—OH) is bonded to a naphthalene ring bonded to an azo group (—N=N—) in ortho position relative to the azo bond, as shown in formulas (1) to (29) in the above described Japanese Unexamined Patent Publication No. 2007-241269, for example. Such azo compounds can form a hydrazone structure when one nitrogen atom in the azo group and a hydrogen atom in the hydroxyl group bond. This is considered to be the reason why azo compounds where the hydroxyl group is bonded in the ortho position do not have a maximum absorption wavelength in a wavelength range having high visual sensitivity. Based on this knowledge, the present inventors completed the present invention.

A polarizer of the present invention contains an azo compound which is represented by the following general formula (I).

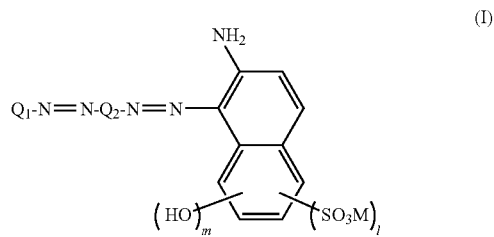

In the general formula (I), $Q_1$ represents an optionally substituted aryl group, $Q_2$ represents an optionally substituted arylene group, M represents a counter ion, l represents an integer of from 1 to 6, and m represents an integer of from 0 to 5. Here, $l+m \leq 6$.

The polarizer containing the azo compound of the present invention has a maximum absorption wavelength in a wavelength range having high visual sensitivity (preferably in a wavelength range of from 520 nm to 580 nm).

Here, the maximum absorption wavelength (λmax) is the wavelength where the degree of absorption is highest.

The main reason why a polarizer where the maximum absorption wavelength is in a wavelength range having high visual sensitivity can be obtained is assumed to the following. That is to say, in the azo compound represented by the general formula (I), an amino group (—$NH_2$) is bonded to a naphthalene ring bonded to an azo group in ortho position relative to the azo bond. Therefore, in the azo compound, the azo group does not form a hydrazone structure, and this is assumed to be the reason why the maximum absorption wavelength is in a wavelength range having high visual sensitivity.

According to another aspect, the present invention provides a coating liquid. The coating liquid contains the azo compound which is represented by the above general formula (I) and a solvent.

The coating liquid of the present invention is used for forming the above polarizer, for example.

According to another aspect, the present invention provides a manufacturing method for a polarizer. The manufacturing method for a polarizer is to form the polarizer by applying the coating liquid on a base material and drying the coating liquid.

According to this manufacturing method, a relatively thin polarizer having a maximum absorption wavelength in a wavelength range having high visual sensitivity can be formed.

In the polarizer of the present invention, the maximum absorption wavelength is in a wavelength range having high visual sensitivity. This polarizer has excellent polarizing property for visible light, and therefore, is appropriate for use in image displays, such as liquid crystal displays.

In addition, the coating liquid of the present invention contains an azo compound with lyotropic liquid crystalline property and the coating liquid has a maximum absorption wavelength in a wavelength range having high visual sensitivity. Therefore, the polarizer of the present invention can be formed by applying the coating liquid on a base material.

DETAILED DESCRIPTION OF THE PREFERRED EMBODIMENTS (Azo Compound Contained in Polarizer of the Present Invention)

A polarizer of the present invention contains an azo compound, which is represented by the following general formula (I). The polarizer containing the azo compound has a maximum absorption wavelength in a wavelength range having high visual sensitivity.

Here, in the present invention, the wavelength range having high visual sensitivity is preferably from 520 nm to 580 nm, more preferably from 530 nm to 570 nm.

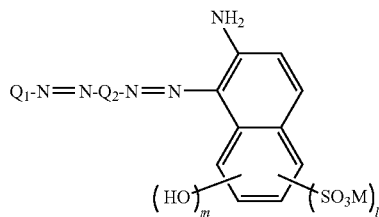

(I)

In the general formula (I), $Q_1$ represents an optionally substituted aryl group, $Q_2$ represents an optionally substituted arylene group, M represents a counter ion, l represents an integer of from 1 to 6, and m represents an integer of from 0 to 5. Here, $l+m \leq 6$.

The term "optionally substituted" means that the aryl group or the arylene group is non-substituted or substituted by one or more substituent group(s).

In the general formula (I), appropriate groups can be used for $Q_1$ and $Q_2$, in order to adjust the range of the absorption wavelength.

In the azo compound of the general formula (I), an aryl group or an arylene group represented by $Q_1$ or $Q_2$ may or may not have substituent group(s). In either case; whether the aryl group or the arylene group represented by $Q_1$ or $Q_2$ is substituted or not, the azo compound of the general formula (I) has a maximum absorption wavelength in a wavelength range having high visual sensitivity. In the case where the aryl group or the arylene group has substituent group(s), halogen, a nitro group, a cyano group, —OM, —COOM, —$SO_3M$ (M represents a counter ion), an alkyl group having a carbon number of from 1 to 4, and an alkoxy group having a carbon number of from 1 to 4 can be cited as examples of the substituent group thereof.

As examples of the aryl group, a condensed ring group where a benzene ring is condensed, such as a naphthyl group, can be cited, in addition to a phenyl group.

As examples of the arylene group, a condensed ring group where a benzene ring is condensed, such as a naphthylene group, can be cited, in addition to a phenylene group.

$Q_1$ in the general formula (I) is preferably an optionally substituted phenyl group, and more preferably an optionally substituted 1, 4-phenyl group. In addition, $Q_2$ in the general formula (I) is preferably an optionally substituted naphthylene group, and more preferably an optionally substituted 1, 4-naphthylene group.

The azo compound of the present invention is characterized in that an amino group is bonded to a naphthalene ring bonded to an azo group in ortho position relative to the azo bond (portion bonded to the azo group). The azo compound of the present invention, where the amino group is bonded in ortho position has a maximum absorption wavelength in a wavelength range having high visual sensitivity (preferably in a wavelength range of from 520 nm to 580 nm). Furthermore, as the azo compound of the present invention, a —$SO_3M$ group is bonded to a naphthalene ring. As a result, the azo compound can be dissolved in water.

Therefore, the azo compound has a stable liquid crystal phase in an aqueous solution.

Preferably, the azo compound of the present invention is a compound, which is represented by the following general formula (II).

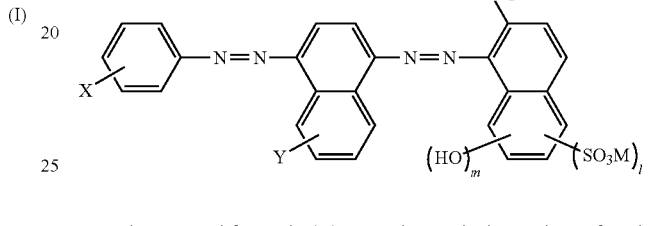

(II)

In the general formula (II), X and Y are independent of each other and represent a halogen atom, a nitro group, a cyano group, a sulfonic acid group which is represented by —$SO_3M$, an optionally substituted alkyl group having a carbon number of from 1 to 4, or an optionally substituted alkoxy group having a carbon number of from 1 to 4, M represents a counter ion, l represents an integer of from 1 to 6, and m represents an integer of from 0 to 5. Here, $l+m \leq 6$.

In the case where the alkyl group having a carbon number of from 1 to 4 or the alkoxy group having a carbon number of from 1 to 4 is substituted, a nitro group, halogen, a nitro group, a cyano group, —OM, —COOM, and —$SO_3M$ (M represents a counter ion) can be cited as examples of the substituent group thereof.

In the general formulae (I) and (II), l is preferably an integer of from 1 to 3, and more preferably an integer of 1 or 2. In the general formulae (I) and (II), m is preferably an integer of from 0 to 2, and more preferably an integer of 0 or 1.

In the general formulae (I) and (II) and the substituent group, M is preferably a hydrogen atom, an alkali metal atom, an alkaline earth metal atom, a metal ion, or a substituted or non-substituted ammonium ion. The metal ion includes, for example, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, $Ce^{3+}$, or the like.

In the case where the above M is a multivalent ion, a plurality of azo compounds share one multivalent ion (counter ion).

The azo compound represented by the general formula (I) or general formula (II) is a disazo compound having two azo groups.

The azo compound represented by the general formula (I) or general formula (II) is a lyotropic liquid crystalline compound exhibiting a liquid crystal phase when dissolved in an appropriate solvent. This azo compound can exhibit a stable liquid crystal phase in a solution state. Therefore, a polarizer having excellent polarizing property can be formed by using a solution containing the azo compound (coating liquid).

Here, the lyotropic liquid crystalline compound is a compound having such property that phase transfer between an isotropic phase and a liquid crystal phase occurs when the temperature, concentration or the like of the solution is changed in a solution; that is, in a state where the compound is dissolved in a solvent (lyotropic liquid crystalline property).

The azo compound represented in the general formula (I) can be synthesized in accordance with "Theoretic Manufacture, Dye Chemistry (Fifth Edition)" by Yutaka Hosoda (published by Gihodo, Jul. 15, 1968, pp. 135-152). For example, the azo compound can be obtained through diazotization and coupling reaction between two compounds having an amino group.

In addition, the azo compound represented in the general formula (II) can be synthesized in accordance with the following method, for example. A monoazo compound can be obtained through diazotization and coupling reaction between an aniline derivative and 8-amino-2-naphthalene sulfonic acid. The monoazo compound is diazotized, and after that an additional coupling reaction is induced with a 6-amino-hydroxynaphthalene sulfonic acid derivative. As a result, the azo compound represented in the general formula (II) can be obtained.

(Polarizer of the Present Invention)

A polarizer of the present invention is a film containing the azo compound, which is represented by the above general formula (I) or/and the azo compound which is represented by the above general formula (II).

The polarizer of the present invention has a maximum absorption wavelength in a wavelength range having high visual sensitivity. The polarizer has a large dichroic ratio in a wavelength range having high visual sensitivity.

Concretely, the dichroic ratio of the polarizer is preferably 3.0 or more, and more preferably 3.5 or more at wavelength of 545 nm.

These properties result from the orientation of the azo compound contained in the polarizer.

Here, the maximum absorption wavelength and the dichroic ratio can be found by measuring a polarization transmittance spectra k1 and k2 using a spectrometer (product name: "V-7100," made by JASCO Corporation) at a temperature for measurement of 23° C. The polarization transmittance spectrum k1 is a transmittance spectrum in the case where polarized light having an electrical field vector parallel to the transmission axis direction of the polarizer enters. The polarization transmittance spectrum k2 is a transmittance spectrum in the case where polarized light having an electrical field vector perpendicular to the transmission axis direction of the polarizer (that is to say, polarized light having an electrical field vector parallel to the absorption axis direction of the polarizer) enters. The maximum absorption wavelength is a wavelength when the polarization transmittance spectrum k2 has a maximum value. The dichroic ratio of the polarizer can be calculated by using the formula: log (1/k2)/log (1/k1).

A thickness of the polarizer is not particularly limited. The polarizer of the present invention is formed by applying the coating liquid, therefore a much thinner polarizer can be formed. Concretely, the thickness of the polarizer is preferably from 0.1 µm to 3 µm.

(Coating Liquid of the Present Invention)

A coating liquid of the present invention contains the azo compound which is represented by the above general formula (I) or/and the above general formula (II) and a solvent which dissolves the azo compounds. This coating liquid has a maximum absorption wavelength in a wavelength range having high visual sensitivity (the wavelength preferably ranges from 520 nm to 580 nm).

The azo compound forms association bodies of super molecules in the coating liquid, and as a result, the liquid exhibits a liquid crystal phase. The type of the liquid crystal phase is not particularly limited, and a nematic liquid crystal phase, a smectic liquid crystal phase and a cholesteric liquid crystal phase can be cited as examples. The liquid crystal phase can be identified and confirmed from an optical pattern when observed using a polarization microscope.

The solvent is not particularly limited and a conventionally known one can be used. The solvent is preferably an aqueous solvent. The aqueous solvent includes water, a hydrophilic solvent, and mixed solvent containing water and the hydrophilic solvent. The hydrophilic solvent is a solvent, which is able to be dissolved with water uniformly. The hydrophilic solvent includes, for example, lower alcohols such as methanol, ethanol, or ethylene glycol; cellosolves such as methyl cellosolve, or ethyl cellosolve; ketones such as acetone, or methyl ethyl ketone; esters such as acetic ether; and the like. Preferably, the solvent is water or mixed solvent containing water and the hydrophilic solvent. Though, a hydrophobic solvent can be used as the solvent.

The coating liquid exhibits a liquid crystal phase by changing temperature of the liquid or concentration of the azo compound contained in the liquid.

A concentration of the azo compound in the coating liquid is preferably prepared so as to exhibit a liquid crystal phase. The concentration of the azo compound in the coating liquid is preferably from 0.5 to 50% by mass. The coating liquid preferably exhibits a liquid crystal phase in a part of concentration range of from 0.5 to 30% by mass.

In addition, a pH of the coating liquid is preferably prepared from about 4 to 10, and more preferably about 6 to 8.

Further, in the coating liquid may be added an additive. The additive includes, for example, a plasticizer, a heat stabilizer, a light stabilizer, a lubricant, an antioxidant, an ultraviolet absorber, a flame retardant, a colorant, an antistatic agent, a compatibilizing agent, a crosslinking agent, or a thickener. A concentration of the additive in the coating liquid is preferably more than 0% by mass and 10% by mass or less. Also, a surfactant may be added to the coating liquid. The surfactant is used to improve wettability and applying property of the coating liquid to the surface of a base material. The surfactant is preferably a nonionic surfactant. A concentration of the surfactant in the coating liquid is preferably more than 0% by mass and 5% by mass or less.

The method for preparing the coating liquid is not particularly limited, and an azo compound may be added in a container containing a solvent, or a solvent may be added in a container containing an azo compound, for example.

(Manufacturing Method for Polarizer of the Present Invention)

The coating liquid can be used as a material for forming a polarizer, for example.

The polarizer of the present invention can be obtained by applying the coating liquid on an appropriate base material so that a thin film is formed, and drying the film.

The polarizer of the present invention can be preferably produced by the following step A to step C.

Step A: a step of applying the coating liquid on a base material so as to form a coating film.

Step B: a step of drying the coating film.

Step C: a step of bringing a surface of the coating film dried in the step B into contact with a solution containing at least one kind of a compound salt selected from the group consisting of aluminum salts, barium salts, lead salts, chromium salts, strontium salts, and compound salts having two or more amino groups in a molecule.

The above base material may be carried out an orientation treatment on the side on which the coating liquid is applied.

<Step A>

The base material is used for uniformly developing of the coating liquid. The base material is not particularly limited as long as it can develop the coating liquid uniformly, and for example, a synthetic resin film (the term "film" includes those generally referred to as sheets), a glass plate, or the like can be used. In a preferable embodiment, the base material is a single polymer film. In another preferable embodiment, the base material is a laminate including a polymer film. The laminate including the polymer film further preferably includes an orientation layer in addition to the polymer film.

The above polymer film is not particularly limited, however, a film being excellent in transparency is preferable (for example, having a haze value of 5% or less).

Examples of the polymer film include a film formed from a polymer such as polyester type such as polyethylene terephthalate or polyethylene naphthalate; cellulose type such as diacetylcellulose or triacetylcellulose; polycarbonate type; acryl type such as polymethyl methacrylate; styrene type such as polystyrene or an acrylonitrile-styrene copolymer; olefin type such as polyethylene, polypropylene, polyolefins having a cyclic or norbornene structure, or an ethylene-propylene copolymer; vinyl chloride type; amide type such as nylon and aromatic polyamide; imide type such as polyimide; polyethersulfone type; polyetheretherketone type; polyphenylene sulfide type; vinyl alcohol type; vinylidene chloride type; vinyl butyral type; acrylate type; polyoxymethylene type; epoxy type; and a polymer film containing two or more kinds of mixture of these polymer or the like. Also, the base material may be a film formed from a laminate body of two or more kinds of the above polymer films.

As these polymer films, a stretched film is preferably used.

A thickness of the above base material can be suitably designed in accordance with the strength and the like. However, in terms of thickness reduction and weight reduction, the thickness is preferably 300 μm or less, more preferably from 5 to 200 μm, and particularly preferably from 10 to 100 μm.

In the case that the above base material contains an orientation layer, this orientation layer is formed by subjecting an orientation treatment to the base material. Examples of the above orientation treatment include a mechanical orientation treatment such as a rubbing treatment, a chemical orientation treatment such as an optical orientation treatment, and the like.

The mechanical orientation treatment can be carried out by rubbing in one direction with a cloth or the like on one surface of the base material (or one surface of a suitable coating film formed on one surface of the base material). Also, the orientation treatment is conducted by stretching a base material (for example polymer film). The orientation layer is formed on one surface of the base material by these mechanical orientation treatments.

The chemical orientation treatment can be carried out by forming an optical orientation film containing an orientation agent on one surface of the base material and radiating light onto the optical orientation film. By this, an orientation layer can be formed on one surface of the base material. Examples of the orientation agent include polymers having a photoreactive functional group that generates a photochemical reaction such as a photoisomerization reaction, an optical ring-opening-closing reaction, a photodimerization reaction, a photodecomposition reaction, and an optical Fries rearrangement reaction, and the like. The orientation agent is preferably an imide type polymer in terms of an orientation efficiency of the azo compound. The optical orientation film can be formed by dissolving the orientation agent into a suitable solvent to form a solution and applying this solution onto the base material.

The coating liquid is applied on the base material (preferably on the orientation layer of the base material). A viscosity of the coating liquid is preferably prepared from 0.1 to 30 mPa·s, and more preferably from 0.5 to 3 mPa·s. Here, the viscosity is a value measured by a rheometer (manufactured by Haake Co., Ltd., product name: RHEOSTRESS 600, measuring condition: double cone sensor shear rate 1000(1/s)).

The coating liquid of the present invention is excellent in the fluidity of the liquid, and further can be easily prepared in an optimum application viscosity range of an applicator (for example, a coater). Therefore, a uniform and thin coating film can be formed on the base material by using the above coating liquid.

As a method for applying the coating liquid on one surface of the base material, an applying method using a suitable coater can be used. The coater is, for example, a bar coater, a reverse roll coater, a positive rotation roll coater, a gravure coater, a rod coater, a slot die coater, a slot orifice coater, a curtain coater, a fountain coater, and the like.

When a coating liquid in such a state as to exhibit a liquid crystal phase is applied, shearing stress is applied to the azo compound in a process where the coating liquid flows, so that a coating film where the azo compound is oriented in a predetermined direction can be formed.

Concretely, the azo compound in the coating liquid exhibiting a liquid crystal phase forms association bodies of super molecules. When the coating liquid containing the azo compound flows and spreads in a predetermined direction, shearing stress is applied to the association bodies of super molecules. As a result, a coating film where the long axes of the association bodies of super molecules made of the azo compound are oriented in the direction in which the liquid flows and spreads, for example, can be formed.

Here, though the azo compound is oriented as a result of the shearing stress applied when the coating liquid flows and spreads, the azo compound can be oriented using another means separately or in combination with this.

As examples of other means, means for applying a coating liquid on a base material on which an orientation treatment is carried out and means for applying a magnetic field or an electrical field after the formation of a coating film by applying the coating liquid on a base material can be cited. These other means can be carried out alone in order to form a coating film where the azo compound is oriented in a predetermined direction.

<Step B>

The coating liquid is applied on the base material so that a coating film is formed, and after that, this is dried.

Drying may be natural drying or forcible drying.

The forcible drying includes, for example, drying means such as an air-circulation type thermostatic oven by which hot air or cool air circulates, a heater using a microwave, a far infrared ray, or the like, a roll heated for temperature adjustment, a heat pipe roll, or a metal belt.

The drying temperature is below or equal to the isotropic phase transition temperature of the coating liquid, and it is preferable to dry the coating film by gradually raising the temperature from low temperature to high temperature. The above drying temperature is preferably from 10° C. to 80° C., more preferably from 20° C. to 60° C. Within such a temperature range, a dried coating film having small thickness variation can be obtained.

The drying time can be suitably selected in accordance with the drying temperature and the kind of the solvent; however, the drying time is, for example, 1 to 30 minutes, preferably 1 to 10 minutes in order to obtain a dried coating film having small thickness variation.

The above coating film will have a higher concentration in the drying process and, in accordance therewith, the azo compound will be oriented and will be fixed in that state. An absorption dichroism, which is a property of a polarizer, is generated by fixing the orientation of the azo compound in the coating film. The obtained dried coating film can be used as a polarizer.

A thickness of the obtained dried coating film is preferably from 0.1 to 3 μm. The residual solvent amount of the dried coating film is preferably 1% by mass or less, and more preferably 0.5% by mass or less.

<Step C>

The surface of the dried coating film (the surface opposite to the bonded surface of the base material) may be imparted water resistance.

Concretely, the surface of the dried coating film formed in the above step B is brought into contact with a solution containing at least one kind of a compound salt selected from the group consisting of aluminum salt, barium salt, lead salt, chromium salt, strontium salt, and compound salts having two or more amino groups in a molecule.

Examples of the above compound salt include aluminum chloride, barium chloride, lead chloride, chromium chloride, strontium chloride, 4,4'-tetramethyldiaminodiphenyl-methane hydrochloride, 2,2'-dipyridyl hydrochloride, 4,4'-dipyridyl hydrochloride, melamine hydrochloride, tetraaminopyrimidine hydrochloride, and the like. By forming a layer of such a compound salt on the dried coating film surface, the surface of the dried coating film can be made insoluble or slightly soluble to water. Therefore, water resistance can be imparted to the dried coating film.

In the solution containing the above compound salt, the concentration of the compound salt is preferably from 3% to 40% by mass, more preferably from 5% to 30% by mass.

As a method of bringing the solution containing the above compound salt into contact with the surface of the dried coating film, one can adopt, for example, a method of applying the solution containing the above compound salt onto the surface of the dried coating film, a method of immersing the dried coating film into the solution containing the above compound salt, or the like. In the case that these methods are adopted, the surface of the dried coating film is preferably dried in advance after being washed with water or an arbitrary medium.

(Application of Polarizer)

The polarizer of the present invention can be used in such a state as to be laminated on the base material. However, the polarizer of the present invention can also be used separately from the base material.

The polarizer of the present invention may be used alone, or another optical film may be laminated. As examples of the another optical films, protective films and retardation films can be cited. When the protective film and/or the retardation film are laminated on the polarizer of the present invention, a polarizing plate can be formed.

In the case where the another optical film is laminated on the polarizer, in practice an appropriate adhesive layer is provided between these. As examples of the material for forming the adhesive layer, adhesive agents, pressure-sensitive adhesive agents and anchor coating agents can be cited.

The application of the polarizer of the present invention is not particularly limited. The polarizer of the present invention is preferably used as a construction component of various image displays.

The image displays includes a liquid crystal display, an organic EL display, a plasma display, and others. A preferable application of the image displays is a television set (particularly a large-scale television set having a screen size of 40 inches or more). In the case that the image display is a liquid crystal display, preferable application thereof is OA apparatus such as a television set, a personal computer monitor, a notebook personal computer, and a copying machine; portable apparatus such as a portable telephone, a clock, a digital camera, a portable digital assistance (PDA), and a portable game machine; a home-use electric apparatus such as a video camera and an electronic range; apparatus to be mounted on a vehicle such as a back monitor, a monitor for a car navigation system, and a car audio device; an exhibition apparatus such as an information monitor for commercial shops; guarding apparatus such as a monitor for supervision; and assisting and medical apparatus such as a monitor for assisting senior persons and a monitor for medical use.

EXAMPLES

In the following, Example and Comparative Example are given in order to further describe the present invention. Here, the present invention is not limited only to the following Example. The methods for analysis used in the Examples are as follows.

(1) Identification of Liquid Crystal Phase

A small amount of a coating liquid was sandwiched between two glass slides and observed using a polarization microscope (product name: "OPTIPHOT-POL," made by Olympus Corporation) at room temperature (23° C.) in order to identify the liquid crystal phase.

(2) Method for Measuring pH in Coating Liquid

The pH was measured by using a pH meter (product name: "Ultra BASIC," made by Denver Instrument Company).

(3) Measurement of Thickness

A portion of the polarizer formed on a norbornene-based polymer film was peeled and the thickness was measured as a step between the film and the polarizer using a three-dimensional non-contact surface form measuring system (product name: "Micromap MM5200," made by Ryoka Systems Inc.).

(4) Measurement of Maximum Absorption Wavelength of Polarizer

A transmittance spectrum was measured using a spectrometer (product name: "V-7100," made by JASCO Corporation) when polarized light having an electrical field vector perpendicular to the transmission axis direction of the polarizer (that is to say, polarized light having an electrical field vector parallel to the absorption axis direction of the polarizer) entered the polarizer. The temperature for measurement was 23° C., and the entering light had a wavelength in a range from 380 nm to 780 nm. The wavelength of light where the transmittance spectrum becomes the maximum is the maximum absorption wavelength.

Example

A monoazo compound was obtained through diazotization and a coupling reaction between 4-fluoroaniline and 8-amino-2-naphthalene sulfonic acid in accordance with the method described in the following document. This monoazo compound was diazotized in accordance with the method described in the document, and after that, an additional coupling reaction was induced with 6-amino-4-hydroxy-2-naphthalene sulfonic acid. As a result, a coarse product containing the azo compound represented in the following structural formula (III) was obtained, and this coarse product was salted out with sodium chloride, and thus, the azo compound represented in the structural formula (III) was obtained.

Document: "Theoretic Manufacture, Dye Chemistry (Fifth Edition)" by Yutaka Hosoda (published by Gihodo, Jul. 15, 1968, pp. 135-152)

pling reaction was induced with 7-amino-1-naphthol-3,6-disulfonic acid lithium salt. As a result, a coarse product containing the azo compound represented by the following structural formula (IV) was obtained, and furthermore, the coarse product was salted out using lithium chloride, and thus, the azo compound represented by the structural formula (IV) was obtained.

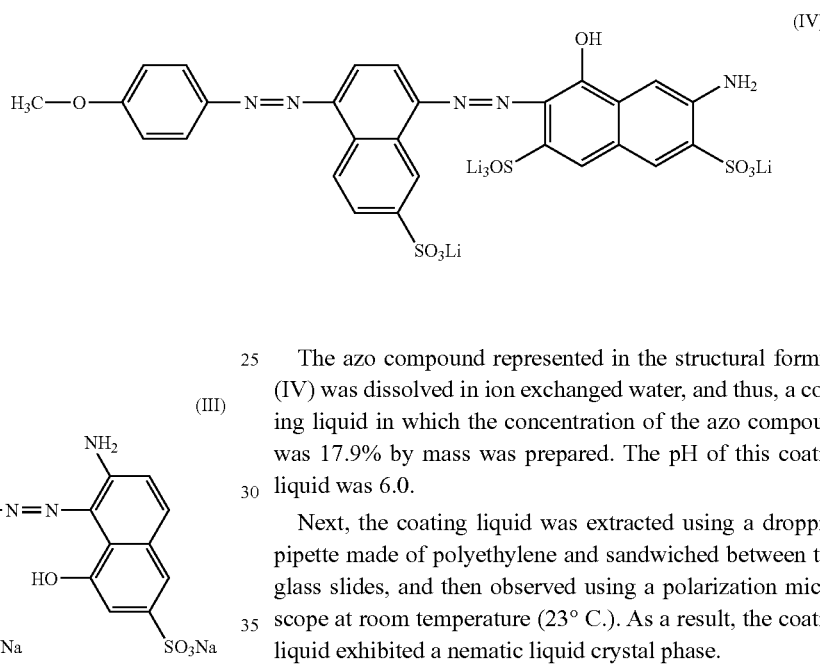

The azo compound represented in the structural formula (III) was dissolved in ion exchanged water, and thus, a coating liquid in which the concentration of the azo compound was 1.8% by mass was prepared. The pH of this coating liquid was 6.7.

Next, the coating liquid was extracted using a dropping pipette made of polyethylene and sandwiched between two glass slides, and then observed by using a polarization microscope at room temperature (23° C.). As a result, the coating liquid exhibited a nematic liquid crystal phase.

The coating liquid was applied on the treated surface of a norbornene-based polymer film (product name: "Zeonor," made by Zeon Corporation) on which a rubbing treatment and corona treatment were carried out by using a bar coater (product name: "Mayer rot HS9," made by Bushman Corporation), and then the coating film was dried naturally inside a thermostatic chamber at 23° C. The dried coating film was a polarizer.

The thickness of the obtained polarizer was 0.2 μm. In addition, the maximum absorption wavelength of the transmittance spectrum of the polarizer was 545 nm.

Comparative Example

A monoazo compound was obtained through diazotization and a coupling reaction between p-anisidine and 8-amino-2-naphthalene sulfonic acid in accordance with the method described in the document in the Example. This monoazo compound was diazotized in accordance with the method described in the document, and after that an additional cou- The azo compound represented in the structural formula (IV) was dissolved in ion exchanged water, and thus, a coating liquid in which the concentration of the azo compound was 17.9% by mass was prepared. The pH of this coating liquid was 6.0.

Next, the coating liquid was extracted using a dropping pipette made of polyethylene and sandwiched between two glass slides, and then observed using a polarization microscope at room temperature (23° C.). As a result, the coating liquid exhibited a nematic liquid crystal phase.

This coating liquid was applied on a norbornene-based polymer film in accordance with the same method as in the Example, and this was dried, so that the polarizer of the Comparative Example was produced.

The thickness of the obtained polarizer was 0.2 μm. In addition, the maximum absorption wavelength of the transmittance spectrum of the polarizer was 615 nm.

The polarizer containing the azo compound of the Comparative Example has a maximum absorption wavelength on the long wavelength side (wavelength: 615 nm) relative to the wavelength range having a high visual sensitivity.

The reason for this is considered to be because the azo compound represented in the structural formula (IV) changes to the azo compound having a hydrazone structure represented in the structural formula (V) over time (refer to the following formulae (IV) and (V)).

Concretely, in the azo compound represented in the structural formula (IV), a hydroxyl group (—OH) is bonded to the naphthalene ring bonded to an azo group (—N═N—) in ortho position relative to the azo bond. This is considered to be because the reactivity of this hydroxyl group is higher, and thus, the hydrogen atom in the hydroxyl group and one nitrogen atom in the azo group bond so as to form a hydrazone structure, and thus, the azo compound represented by the structural formula (IV) changes its molecular structure.

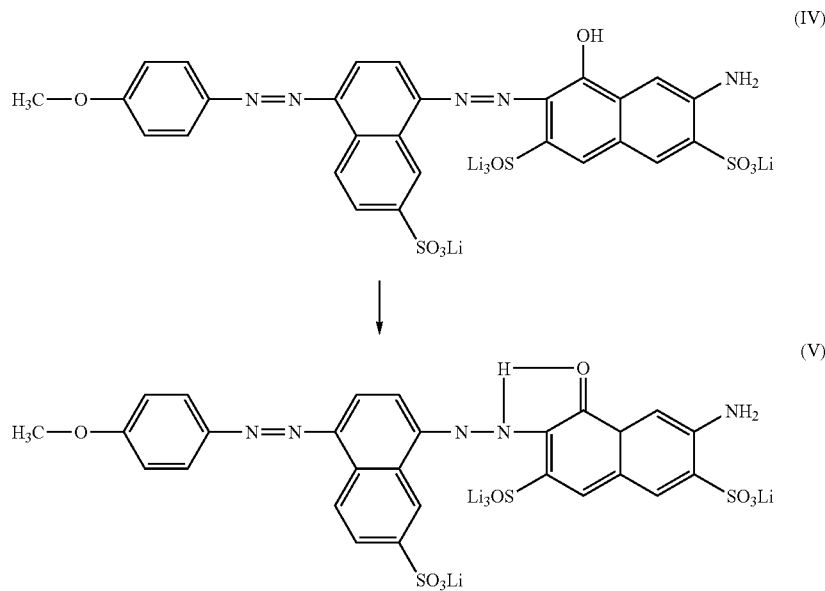

What is claimed is:

1. A polarizer comprising an azo compound which is represented by the following general formula (II):

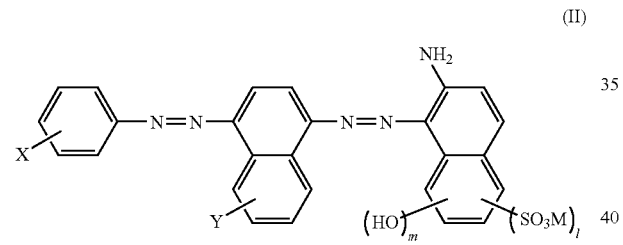

wherein, X and Y are independent of each other and represent a halogen atom, a nitro group, a cyano group, a sulfonic acid group which is represented by —SO₃M, an optionally substituted alkyl group having a carbon number of from 1 to 4, or an optionally substituted alkoxy group having a carbon number of from 1 to 4, M represents a counter ion, l represents an integer of from 1 to 6, and m represents an integer of from 0 to 5, and wherein, l+m≦6.

2. The polarizer according to claim 1, which has a maximum absorption wavelength in a wavelength range from 520 nm to 580 nm.

3. A coating liquid comprising an azo compound which is represented by the following general formula (II) and a solvent

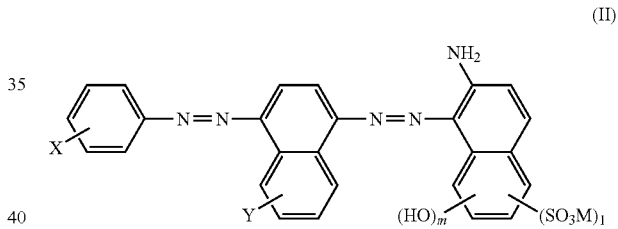

wherein, X and Y are independent of each other and represent a halogen atom, a nitro group, a cyano group, a sulfonic acid group which is represented by —SO₃M, an optionally substituted alkyl group having a carbon number of from 1 to 4, or an optionally substituted alkoxy group having a carbon number of from 1 to 4, M represents a counter ion, l represents an integer of from 1 to 6, and m represents an integer of from 0 to 5, and wherein, l+m≦6.

4. A manufacturing method for a polarizer, wherein a polarizer is formed by applying the coating liquid according to claim 3 on a base material and drying the coating liquid.

* * * * *